United States Patent [19]
Zum Mallen

[11] Patent Number: 5,962,361
[45] Date of Patent: Oct. 5, 1999

[54] METHODS OF MAKING AND USING CATALYST PRECURSOR

[75] Inventor: Michael Philip Zum Mallen, Sugar Land, Tex.

[73] Assignee: Union Carbide Chemicals & Plastics Technology Corporation, Danbury, Conn.

[21] Appl. No.: 09/172,543

[22] Filed: Oct. 14, 1998

[51] Int. Cl.$^6$ .................................................. B01J 31/00
[52] U.S. Cl. .................... 502/107; 502/102; 502/103; 502/104; 502/115; 502/118; 502/119; 502/120; 502/121; 502/122; 502/123; 502/124; 502/125; 502/126; 502/127; 502/128; 502/129; 502/130; 502/131; 502/132; 502/133; 502/134; 526/943
[58] Field of Search ...................... 502/102, 103, 502/104, 107, 115, 118–134; 526/943

[56] References Cited

U.S. PATENT DOCUMENTS

| | | | |
|---|---|---|---|
| 4,410,671 | 10/1983 | Welcn et al. | 526/119 |
| 4,465,783 | 8/1984 | McKenzie | 502/105 |
| 4,472,521 | 9/1984 | Band | 502/104 |
| 4,497,905 | 2/1985 | Nozaki | 502/107 |
| 4,548,915 | 10/1985 | Goodall et al. | 502/104 |
| 4,618,595 | 10/1986 | Dietz | 502/108 |
| 4,710,482 | 12/1987 | Job | 502/127 |
| 4,728,705 | 3/1988 | Nestlerode et al. | 526/125 |
| 4,771,024 | 9/1988 | Nestlerode et al. | 502/127 |
| 5,024,982 | 6/1991 | Hawley et al. | 502/110 |
| 5,034,361 | 7/1991 | Job et al. | 502/9 |
| 5,066,737 | 11/1991 | Job | 526/119 |
| 5,077,357 | 12/1991 | Job et al. | 502/125 |
| 5,079,204 | 1/1992 | Lee | 502/104 |
| 5,082,907 | 1/1992 | Job | 526/119 |
| 5,106,806 | 4/1992 | Job | 502/111 |
| 5,146,028 | 9/1992 | Job | 585/512 |
| 5,244,990 | 9/1993 | Mitchell | 526/125 |
| 5,362,825 | 11/1994 | Hawley et al. | 526/125 |
| 5,567,665 | 10/1996 | Wagner et al. | 502/9 |
| 5,604,172 | 2/1997 | Wagner et al. | 502/120 |
| 5,652,314 | 7/1997 | Wagner et al. | 526/97 |

FOREIGN PATENT DOCUMENTS 113937   12/1982   European Pat. Off. .

*Primary Examiner*—Elizabeth D Wood
*Attorney, Agent, or Firm*—P. A. Doody

[57] ABSTRACT

A method of making a solid, substantially dry olefin polymerization procatalyst precursor is disclosed whereby a solid precursor containing magnesium and titanium is formed in a slurry or solution, the solid then is separated from the solution and then dried at a temperature above 50° C. for over an hour. Solid, substantially dry olefin polymerization procatalyst precursors made by the method also are disclosed, whereby the precursors are easier to handle, have better flowability, reduced clumpness and provide catalysts that can be used to produce polymers having improved extrudability, less filter clogging, less "talc"-like polymer particles of <10 micron in size and reduced polymer product segregation in storage.

10 Claims, No Drawings

METHODS OF MAKING AND USING CATALYST PRECURSOR

BACKGROUND OF THE INVENTION

1. Field of the Invention

The present invention relates to catalyst precursors, to methods of making the catalyst precursors and to methods of using the catalyst precursors. The catalyst precursors of the present invention are useful in preparing α-olefin polymerization procatalysts that can yield polymerized α-olefins having a narrow polymer size distribution and reduced polymer fines. The catalyst precursors also are easier to handle, transport to and from downstream processes, and produce polymers having improved extruder operability, less filter clogging, less "talc" (or polymer fine particles <10 micron) and reduced polymer product segregation in storage.

2. Description of Related Art

Polymers and copolymers of lower α-olefins, particularly, ethylene, propylene and butylene are widely used throughout the world. These polymeric products typically are relatively inexpensive to manufacture, and they exhibit a number of commercially useful properties. When ethylene is polymerized, the process is relatively uncomplicated in that the product type is not influenced by the manner in which the ethylene molecules add to the growing polymeric chain during polymerization. The polymeric product of ethylene does not generally exist in stereoisomeric forms.

When propylene is polymerized, however, the presence of pendant methyl groups on the polymeric chain provides a possibility of several product types, depending on the steric regularity with which propylene molecules add to the growing chain. Much if not most of the commercial polypropylene results from the stereoregular addition of propylene molecules in a regular head-to-tail manner. The form of polymer having a substantial proportion of random addition of propylene units is termed atactic and this amorphous form is less desirable. If present in a significant proportion, the atactic polymer must be removed through an extraction process to provide a more desirable crystalline material.

These polymers typically are formed by using a polymerization catalyst. The activity of the catalyst is significant in that the more polymer produced per unit weight of catalyst the better. The early titanium, chromium or vanadium catalysts were of low activity and the product contained a significant proportion of catalyst residues. These residues had to be removed in an effort to obtain commercially satisfactory properties.

More recent titanium-based olefin polymerization catalysts are stereoregulating and have sufficient activity to avoid extraction and deashing. These high activity catalysts typically are prepared from a solid procatalyst that usually contains magnesium, titanium and halide moieties, a cocatalyst (usually an organoaluminum compound) and a selectivity control agent (SCA). The solid titanium-containing compound typically is referred to as a "procatalyst," the organoaluminum compound, whether complexed or not, usually is referred to as the "cocatalyst" and the third component external electron donor, whether used separately or partially or totally complexed with the organoaluminum compound, is referred to as the "selectivity control agent." Throughout this disclosure, these terms will be used in accordance with the aforementioned designations.

Many chemical combinations of procatalysts, cocatalysts and selectivity control agents are known in the art to produce active catalysts. Through considerable experience, however, certain materials are of greater interest than others. For example, there is significant research in the area of procatalysts, which typically is some chemical combination of magnesium, titanium tetrachloride and an internal electron donor. These internal electron donors usually are aromatic esters such as ethyl benzoate or ethyl p-toluate. Conventional cocatalysts include an aluminum trialkyl such as triethylaluminum or triisobutylaluminum that is often complexed with a portion of the selectivity control agent (or external electron donor), which also is typically an aromatic ester. Although variations in any of these catalyst components will influence the performance of the resultant catalyst, the component that appears to offer the greatest opportunity for modification to produce greater catalyst activity is the procatalyst.

The literature is rife with disclosures relating to the various known methods of preparing procatalysts. For example, Kioka, et al., U.S. Pat. No. 4,330,649, the disclosure of which is incorporated by reference herein in its entirety, describes a solid catalyst component (procatalyst) that is prepared by heating a soluble magnesium compound such as magnesium chloride with a higher alcohol in the presence of an ester to produce a solution. This solution contains a "precursor" of the procatalyst, which then is added to titanium tetrachloride and an electron donor (internal) to form the procatalyst. Brand, U.S. Pat. No. 4,472,521, the disclosure of which is incorporated by reference herein in its entirety, reacts a magnesium alkoxide, wherein each alkoxide has four or more carbons, in the presence of an aromatic hydrocarbon. Titanium tetrachloride and an internal electron donor then are added to the resulting solution to form a solid procatalyst. Arzoumanidis, U.S. Pat. No. 4,540,679, the disclosure of which is incorporated by reference herein in its entirety, produces an olefin polymerization catalyst component by contacting a suspension of magnesium ethoxide in ethanol with carbon dioxide. The addition of organoaluminum in hydrocarbon results in the formation of granular particles that are employed as a support for a titanium compound upon contact with titanium tetrachloride. Nestlerode, et al., U.S. Pat. No. 4,728,705, the disclosure of which is incorporated by reference herein in its entirety, solubilizes magnesium ethoxide in ethanol with carbon dioxide and spray dries the resulting solution or uses the solution to impregnate carrier particles. The solid particles resulting from either modification are useful in the production of a procatalyst of desirable morphology.

A number of United States patents issued to Robert C. Job (and Robert C. Job, et al.,) describe various mechanisms for preparing magnesium-containing, titanium-containing compounds that are useful as precursors for the production of procatalysts that are ultimately useful in preparing catalysts for the polymerization of α-olefins. For example, U.S. Pat. Nos. 5,034,361; 5,082,907; 5,151,399; 5,229,342; 5,106,806; 5,146,028; 5,066,737; and 5,077,357, the disclosures of which are incorporated by reference herein in their entirety, disclose various procatalyst precursors. U.S. Pat. No. 5,034,361 discloses solubilizing a magnesium alkoxide in an alkanol solvent by interaction of the magnesium alkoxide compound and certain acidic materials. This magnesium alkoxide then can be used either directly as a magnesium-containing catalyst precursor, or can be reacted with various titanium compounds to produce a magnesium and titanium-containing catalysts precursor.

U.S. Pat. Nos. 5,082,907; 5,151,399; 5,229,342; 5,106,806; 5,146,028; 5,066,737; and 5,077,357 disclose various magnesium and titanium-containing catalyst precursors, some of which are prepared by using the aforementioned magnesium alkoxide as a starting material. These precursors are not active polymerization catalysts, and they do not contain any effective amounts of electron donor. Rather, the precursors are used as starting materials in a subsequent conversion to an active procatalyst. Magnesium and titanium-containing procatalysts are formed by reacting the magnesium and titanium-containing precursor with a tetravalent titanium halide, an optional hydrocarbon and an electron donor. The resulting procatalyst solid then is separated from the reaction slurry (by filtration, precipitation, crystallization, and the like). These procatalysts are then converted to polymerization catalysts by reaction with, for example, an organoaluminum compound and a selectivity control agent. It was known to store procatalyst components in a mineral oil slurry as described in, for example, U.S. Pat. No. 4,548,915, the disclosure of which is incorporated by reference herein in its entirety.

It was known previously to dry the precursor in laboratory experiments in an effort to analyze the precursor. The Job patents referred to above describe drying the precursors under flowing nitrogen at ambient temperatures for less than two hours. These dried solid precursors then were converted to procatalysts by reacting the precursor with additional titanium halides and an internal electron donor. The resulting solid procatalysts then were separated from the slurry and used together with a cocatalyst and an optional selectivity control agent in the polymerization of olefins.

Previous experience with pro-catalyst and pro-catalyst precursor suggested that, for certain cases, heating magnesium and titanium-containing catalyst particles (procatalyst or precursors) above 50° C. during a drying processes would significantly hamper catalyst productivity. Thus, precursors have heretofore been commercially produced with limited temperature drying. Previously, it was known that drying the precursor at ambient temperatures (up to about 46° C.) could yield a substantially dry product without significantly decreasing catalyst productivity. Drying was effected by passing nitrogen at about 46° C. through the precursor material, which contained solvents (i.e., isopentane, isooctane, etc.) that were used to wash the material.

While the above drying conditions offered a material which was substantially dry (free of residual solvent) by analysis, difficulties have arisen during conveying of dried precursor to downstream processes Specifically, difficulties have arisen during this conveying, which takes an extended period of time (typically about 2 hours or more). There are multiple interruptions in the process that could stem from bridging or clumping of the "dry" precursor. In addition, there still exists a need to improve the material's eventual polymer product characteristics, including improved extruder operability, reduced filter clogging, reduced "talc" (or very fine polymer particles) and reduced polymer product segregation in storage prior to extrusion and pelletizing.

SUMMARY OF THE INVENTION

Thus, there exists a need to provide a magnesium and titanium-containing precursor that can be used to prepare polymerization catalysts that do not suffer from the aforementioned disadvantages. There also exists a need to provide a magnesium and titanium-containing catalyst precursor that produces polymer products having less fines, a narrower particle size distribution, better extruder operability, reduced filter clogging, less "talc" (or fine polymer particles <10 micron) and reduced polymer product segregation. In addition, these exists a need a develop a magnesium and titanium containing catalyst precursor which reduces batch cycle time in producing a polymerization procatalyst. There also exists a need to provide a magnesium and titanium-containing catalyst precursor that has improved flowability, to reduce the time associated with product conveying and reduce the number of interruptions in dry precursor product flow.

In accordance with these and other objectives of the present invention, there is provided a solid, substantially dry magnesium and titanium-containing precursor of high activity olefin polymerization catalysts. In accordance with an additional objective of the invention, there is provided a process for making a solid, substantially dry magnesium and titanium-containing precursor of high activity olefin polymerization catalysts. In accordance with yet an additional object of the invention, there are provided high activity olefin polymerization catalysts prepared by using the solid, substantially dry magnesium and titanium-containing precursor, as well as olefin polymers prepared using the high activity olefin polymerization catalysts.

The invention provides a solid, substantially dry olefin polymerization procatalyst precursor comprising magnesium, titanium and optionally at least one compound selected from the group consisting of alkoxide, trialkylborate and optionally substituted phenoxide. The method of making the solid, substantially dry olefin polymerization procatalyst precursor is not particularly limited, as long as the method encompasses drying the resultant solid precursor to remove residual liquids including water, solvents, and the like. Preferably, the solid precursor is dried at temperatures above 50° C. for over an hour.

The invention also provides a high activity olefin polymerization procatalyst that comprises: (i) the procatalyst precursor comprising magnesium and titanium and, optionally, at least one compound selected from the group consisting of alkoxide, trialkylborate and optionally substituted phenoxide, as described above; (ii) an electron donor; (iii) a halide of tetravalent titanium; and (iv) optionally, a hydrocarbon. The invention additionally provides a high activity olefin polymerization catalyst that comprises: (i) the above-described procatalyst; (ii) an organoaluminum cocatalyst; and (iii) a selectivity control agent. The invention also provides methods of making each of the above-described precursors, procatalysts and catalysts. In addition, the invention provides methods of polymerizing olefins (homopolymers, copolymers, terpolymers, etc.) by contacting an olefin monomer (or monomers) with the above-described procatalyst, cocatalyst and selectivity control agent.

DETAILED DESCRIPTION OF PREFERRED EMBODIMENTS

Throughout this description, the phrase "substantially dry," insofar as it defines the high activity olefin polymerization procatalyst precursor, denotes a precursor that preferably has a residual liquid concentration of less than about 15% by weight, based on the total weight of the precursor. More preferably, the residual liquid concentration is less than 10% by weight, and most preferably, the residual liquid concentration is less than 7% by weight.

Throughout this description, the expression "residual liquid" as it refers to the residual liquid concentration of the precursor, denotes the remaining liquid components of the precursor. These liquid components include, but are not limited to, water, any solvents used during preparation of the precursor, any solvent used in the subsequent washing of the precursor and any solvent impurities in any of the raw materials used to prepare the precursor.

Throughout this description the term "precursor" and the expression "procatalyst precursor" denotes a material that is not an active catalyst, does not contain an electron donor, and that can be converted to a "procatalyst" (defined below) by contacting it with a metal halide (preferably TiCl$_4$) and an electron donor. Throughout this description, the term "procatalyst" denotes a solid material that is an active catalyst component, and that can be converted to a polymerization catalyst by contact with an organoaluminum compound (preferably triethyl aluminum (TEAL)), and an optional external donor, or selectivity control agent.

As mentioned above, the solid, substantially dry olefin polymerization procatalyst precursor of the invention comprises magnesium, titanium and optionally at least one compound selected from the group consisting of alkoxide, trialkylborate and optionally substituted phenoxide. Any method of making the precursor is suitable, as long as the resultant solid precursor particle is dried to result in a solid, substantially dry precursor. Various methods of making magnesium and titanium-containing high activity olefin polymerization procatalyst precursors are known in the art. These methods are described, inter alia, in U.S. Pat. Nos.: 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; and 5,247,032, the disclosures of each of these documents being incorporated by reference herein in their entirety. Particularly preferred methods of making a solid, substantially dry high activity olefin polymerization procatalyst precursor are described below.

In one preferred embodiment, the procatalyst precursor is produced in a two-step synthesis initially involving the reaction of a magnesium alkoxide, i.e., Mg(OR)$_2$, and a titanium tetraalkoxide, i.e., Ti(OR)$_4$, in which the alkoxide moieties independently contain up to 4 carbon atoms, with certain phenolic compounds. The alkoxide moieties of the two metal alkoxide reactants can be the same or different, as are the alkoxide moieties within an individual alkoxide reactant. The group OR can be any alkoxide radical selected from methoxide, ethoxide, n-propoxide and n-butoxide. Preferably, OR is ethoxide.

Various phenolic compounds can be used as an initial reactant. Preferably, the phenolic compound is selected from phenol or activating group-substituted phenol. The expression "activating group" as it is used in this context, denotes a ring carbon atom substitutent free from active hydrogen atoms that is ortho-para directing relative to further aromatic ring substitution and which is generally but not invariably electron donating. Specifically preferred activiating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds useful as an initial reactant include phenol, p-cresol, o-cresol, 3-methoxyphenol, e-dimethylaminophenol, 2,6-dimethylphenol and 2,6-di-t-butyl-4-methylphenol. The o-cresol phenolic compound is particularly preferred.

The initial reaction typically takes place in an inert reaction diluent by contacting magnesium alkoxide, titanium alkoxide and the phenolic compound at an elevated temperature. Any reaction diluent that is inert towards the reactants and has a relatively high boiling point so as to be a liquid during the contacting stage can be used. Preferred diluents include chlorobenzene, toluene, xylene and isooctane. Chlorobenzene is particularly preferred. The temperature at which the ingredients are reacted typically is within the range of from about 60° C. to about 130° C. at a pressure sufficient to maintain the reaction mixture in a liquid phase. The initial product is a stoichiometric complex of the starting materials illustrated but not limited by the formula (I):

$$Mg_3Ti(phenolate)_2(OR)_8 \qquad (I)$$

wherein R independently is a lower alkyl of up to 4 carbon atoms inclusive, and phenolate is the anion corresponding to the phenolic compound reactant. This product usually is a clear solution in the reaction diluent employed in its production.

The initial complex then is contacted with a magnesium halide alcoholate, preferably a hexaalcoholate, in which the alcohol moieties are of the formula ROH where R independently is a lower alkyl of up to 4 carbon atoms inclusive. The magnesium halide preferably is a magnesium chloride or a magnesium bromide (magnesium chloride is particularly preferred). The initial complex and the magnesium halide alcoholate are mixed in an inert reaction diluent that is the same as the diluent used in the production of the initial complex or is different by virtue of the addition of a co-diluent or by diluent exchange. Preferably, the diluent is the same and the second synthetic procedure comprises the addition of the magnesium halid alcoholate to the product mixture containing the initial complex.

The reactants preferably are contacted and heated at a relatively mild temperature, e.g., up to about 100° C., until a clear solution is obtained and then heated at a higher temperature, from about 110° C. to about 140° C., for example, to remove ethanol from the reaction mixture, typically as an azeotrope with a portion of the reaction diluent. This ethanol removal is accompanied by the formation of opaque, spheroidal particles and typically ethanol is removed until the production of such particles ceases.

The solid precursor materials then can be separated from the reaction mixture by any suitable means, including but not limited to, decantation, filtration, centrifugation, and the like. Preferably, the solid material is filtered, most preferably under the impetus of pressure. The filtered solids then are washed at least once with one or more solvents, including but not limited to monochlorobenzene, toluene, xylene, isopentane, isooctane, and the like. These wash solvents then can be removed by any means, but preferably are removed by blowing an inert gas through the filter cake. The dried filter cake then can be subjected to the drying treatment of the present invention, as described in more detail below.

Alternatively, the solid precursor materials can be separated from the reaction solution or slurry by any means capable of separating a solid from a liquid. For example, the mixture containing the magnesium and titanium-containing precursor of the present invention can produce the solid, substantially dry high activity olefin polymerization procatalyst precursor by conventional methods such as impregnation, spray drying or spray cooling. Spray drying processes are well known in the art and are described, for example, in Job, U.S. Pat. No. 5,034,361 and Nestlerode, et al., U.S. Pat. No. 4,771,024, the disclosures of which are incorporated by reference herein in their entirety. The solution containing the magnesium and titanium-containing precursor usually is passed through a suitable atomizer to produce a spray or dispersion of droplets of the liquid mixture, a stream of hot gas such as nitrogen is arranged to contact the droplets to evaporate the solvent and the resulting solid product is collected. Atomization of the solution typically takes place in the absence of water or oxygen and nozzle atomizers or spinning disk atomizers are usually employed.

In another preferred embodiment, the procatalyst precursor can be produced by contacting a magnesium alkoxide, a titanium alkoxide, a titanium halide, a phenolic compound and an alkanol. The alkoxide moieties in the magnesium alkoxide and the titanium alkoxide are the same as those described above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, isopropoxide and butoxide are useful, the preferred alkoxide moieties are ethoxide. The halide moieties of the titanium tetrahalide preferably are chloride or bromide with chloride being particularly preferred.

The phenolic compound used in the production of the procatalyst precursor preferably is the same as the phenolic compound described above. Preferably, the phenolic compound is selected from phenol or activating group-substituted phenol. The expression "activating group" as it is used in this context, denotes a ring carbon atom substitutent free from active hydrogen atoms that is ortho-para directing relative to further aromatic ring substitution and which is generally but not invariably electron donating. Specifically preferred activiating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds useful as an initial reactant include phenol, p-cresol, o-cresol, 3-methoxyphenol, 4-dimethylaminophenol, 2,6-dimethylphenol and 2,6-di-t-butyl-4-methylphenol. The o-cresol phenolic compound is particularly preferred.

The solid, substantially dry procatalyst precursor is produced by contacting the reactants in an inert reaction diluent. The diluent preferably is a hydrocarbon diluent such as isopentane, isooctane, cyclohexane, xylene, or toluene or a halohydrocarbon such as methylene chloride or chlorobenzene. Isooctane is a preferred hydrocarbon diluent and chlorobenzene is a preferred halohydrocarbon diluent. Although the formation of the procatalyst precursor does not appear to observe conventional molar stoichiometry, the production of the precursor is illustrated by the following partial general equation (employing preferred alkoxide and halid moieties):

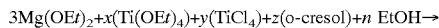

3Mg(OEt)$_2$+x(Ti(OEt)$_4$)+y(TiCl$_4$)+z(o-cresol)+n EtOH→ wherein y is more than about 0.1 but less than about 0.8, preferably more than 0.3 but less than 0.5, (x+y) is more than about 0.2 but less than about 3, preferably more than about 0.5 but less than about 2, z is more than about 0.05 but less than about 3, preferably more than about 0.1 but less than about 2, and n is more than about 0.5 but less than about 9, preferably more than about 2 but less than about 5.

The initial interaction of the reactants in the reaction diluent takes place in a non-gaseous state at a moderate reaction temperature. Suitable reaction temperatures are from about 30° C. to about 120° C., preferably from about 35° C. to about 90° C. This initial heating usually results in the formation of a generally clear solution. This solution then can be heated to a higher temperature to remove alkanol, ethanol in the preferred embodiment, typically as an azeotrope with a portion of the inert diluent. The temperature of this second heating will depend in part on the boiling point of any azeotrope containing alkanol that is formed. Typical heating temperatures are from about 70° C. to about 120° C., preferably from about 85° C. to about 110° C. Removing the alcohol usually results in the formation of a procatalyst precursor in the form of solid opaque, spheroidal particles.

In another preferred embodiment of the invention, the solid, substantially dry high activity olefin polymerization procatalyst precursor is prepared by reacting a magnesium alkoxide, a titanium alkoxide and a phenolic compound at an elevated temperature in an inert diluent. The magnesium alkoxides, titanium alkoxides and phenolic compounds can be the same as the respective compounds described in the embodiments above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, isopropoxide and butoxide are useful, the preferred alkoxide moieties are ethoxide. The halide moieties of the titanium tetrahalide preferably are chloride or bromide with chloride being particularly preferred. In this embodiment, in part for reasons of complex alkoxide compound purity and for ease of handling, the alkoxide moieties of both the magnesium alkoxide and the titanium alkoxide preferably are all ethoxide.

The phenolic compound, which is characterized as producing an anion group X in the formula below, preferably is selected from phenol or activating group-substituted phenol whose phenolic hydroxyl group is free from steric hindrance. The expression "activating group" as it is used in this context, denotes a ring carbon atom substitutent free from active hydrogen atoms that is ortho-para directing relative to further aromatic ring substitution and which is generally but not invariably electron donating. Specifically preferred activiating groups include alkyl of up to 5 carbon atoms, e.g., methyl, ethyl, isopropyl or t-butyl; alkoxy of up to 5 carbon atoms, e.g., methoxy, ethoxy, butoxy, or amyloxy; halo, particularly chloro or bromo; and dialkylamino where each alkyl has up to 5 carbon atoms such as dimethylamino and diethylamino. Particularly preferred phenolic compounds whose anions are suitable X groups in the formula below, and which are useful as an initial reactant include phenol, p-cresol, o-cresol, 3-methoxyphenol, 4-dimethylaminophenol, 2,6-dimethylphenol and 2,6-di-t-butyl-4-methylphenol. The o-cresol phenolic compound is particularly preferred, and the preferred X anion is the o-cresylate anion.

The solid, substantially dry procatalyst precursor is produced by contacting the reactants in an inert reaction diluent. The diluent preferably is a hydrocarbon diluent such as isopentane, isooctane, cyclohexane, xylene, or toluene, or even a kerosene fraction, or the diluent is a halohydrocarbon such as methylene chloride or chlorobenzene. Isooctane is a preferred hydrocarbon diluent and chlorobenzene is a preferred halohydrocarbon diluent. Although the formation of the procatalyst precursor does not appear to observe conventional molar stoichiometry, the complex alkoxide compounds can be illustrated by the formula (II):

$$Mg_3Ti_m(OR)_nX_p \qquad (II)$$

wherein R independently is lower alkyl of up to 4 carbon atoms inclusive and X is a monovalent anion of the phenolic compound, $0.5 < m \leq 2.0$, $0 \leq p \leq 2.0$, and n has a value of $(6+4m-p)$ A preferred embodiment of the complex alkoxide compound is illustrated by the following formula (III):

$$Mg_3Ti(OR)_8X_2 \qquad (III)$$

wherein R and X have the previously stated meaning.

The compounds used to make the precursor of this preferred embodiment typically are contacted at an elevated temperature and at a pressure sufficient to maintain the reaction mixture in a non-gaseous state. Suitable temperatures are from 50° C. to about 110° C. The contacting usually is conducted in a suitable reactor and contact is facilitated by conventional techniques such as shaking, stirring or refluxing. The stoichiometry of the contacting is not simple but sufficient magnesium alkoxide is provided so that the resulting solution of complex alkoxide compound has from about 1% by weight to about 6% by weight of magnesium. The formation of the complex alkoxide compound can be illustrated by the following partial equation which employs the preferred metal ethoxides:

$$x \text{ phenolic compound} + y \, Mg(OEt)_2 + z \, Ti(OEt)_4 \rightarrow$$

wherein the relative quantities of reactants are such that x is a number from 0 to about 2, y is a number from about 3 to about 4.5 and z is a number from about 0.5 to about 1.5. The complex alkoxide compound product mixture that results is a solution whose viscosity varies from "runny" to viscous depending upon the particular diluent employed and the quantity thereof as well as the ratio of starting materials employed.

The procatalyst precursor then can be crystallized by removal of alcohol to form solid opaque, spheroidal particles. These solid particles then can be separated from the mixture and dried in accordance with the procedures described above.

The solid, substantially dry high activity olefin polymerization procatalyst precursor of the invention also can be prepared by contacting a magnesium alkoxide, a titanium alkoxide and a borate ester in an alkanol solution. The magnesium alkoxide and titanium alkoxide compounds can be the same as the respective alkoxides described above. Specifically, the alkoxide moieties independently have up to 4 carbon atoms inclusive. The alkoxide moieties within one reactant are the same or different if more than one alkoxide moiety is present, and the alkoxide moieties of one reactant are the same or different from alkoxide moieties in other reactants. Although alkoxide moieties such as methoxide, propoxide, i-propoxide, n-butoxide or i-butoxide are useful, the preferred alkoxide moieties are ethoxide. The halide moieties of the titanium tetrahalide preferably are chloride or bromide with chloride being particularly preferred. In this embodiment, in part for reasons of complex alkoxide compound purity and for ease of handling, the alkoxide moieties of both the magnesium alkoxide and the titanium alkoxide preferably are all ethoxide.

The stoichiometry of the complex alkoxide compound is of the following formula (IV):

$$Mg_3Ti_2(OR)_{14} \qquad (IV)$$

wherein R independently is alkyl of up to 4 carbon atoms inclusive and is preferably ethyl.

The contacting of magnesium, titanium and boron compounds takes place in an alkanol solution at an elevated temperature and at a pressure sufficient to maintain the reaction mixture in a non-gaseous state. The alkanol preferably but not necessarily corresponds to the alkoxide moieties of one or more of the reactants. Suitable reaction temperatures are from about 20° C. to about 180° C., but preferably are from about 50° C. to about 90° C. The contacting is conducted in a suitable reactor and is facilitated by conventional techniques such as shaking, stirring or refluxing. The stoichiometry of the reaction is illustrated by the partial equation, employing preferred ethoxide moieties:

$$3Mg(OEt)_2 + 2Ti(OEt)_4 + 1.5B(OEt)_3 \rightarrow$$

The product obtained is a crystalline alcoholate upon cooling of the product mixture, and is illustrated by the following formula (V):

$$Mg_3Ti_2(OEt)_{14} \cdot n(EtOH) \qquad (V)$$

wherein n is a number of from 0 to about 6.

In this embodiment, the trialkylborate is present even though boron does not appear in the crystalline product but remains in the mother liquor. The trialkylborate preferably is provided to the reaction mixture in an amount from about 0.1 mole to about 2 moles per mole of titanium, more preferably from about 0.5 mole to about 1 mole per mole of titanium. The magnesium alkoxide preferably is provided in an amount of from about 0.5 mole to about 4 moles per mole of titanium. Quantities of magnesium alkoxide from about 1 mole to about 2 moles per mole of titanium are preferred.

The resulting complex alkoxide compound alcoholate is a solid, crystalline material of low solubility in the medium of its production and is recovered from the product mixture by well known methods such as filtration or decantation. The alcoholate then is converted to the complex alkoxide compound by removal of alkanol (ethanol in the preferred embodiment). The alkanol can be removed by conventional procedures and generally involves heat. A particularly satisfactory method for alkanol removal is by an azeotropic distillation with a hydrocarbon or halohydrocarbon solvent. Any hydrocarbon or halohydrocarbon in which the complex alkoxide compound is soluble and with which the alkanol forms an azeotrope can be used for this purpose. A particularly useful hydrocarbon is isooctane and a particularly useful halohydrocarbon is chlorobenzene. The azeotropic solvent typically is added in a molar quantity in excess of the alkanol present and the resulting mixture then is heated to remove the alkanol. The complex alkoxide compound that results forms a clear solution in the excess hydrocarbon or halohydrocarbon at the boiling temperature of the azeotrope as well as upon cooling to ambient temperature.

The procatalyst precursor then can be crystallized by removal of alcohol to form solid opaque, spheroidal particles. These solid particles then can be separated from the mixture in accordance with the procedures described above.

After separation from the mixture, (or mother liquor, and subsequent wash solvents), the solid procatalyst precursor is dried. Drying typically was conducted by supplying dry, moisture-free inlet nitrogen at a temperature of about 45° C. for about 1 hour resulting in a product which is substantially dry (as defined above) and which contained, on average, less than 2 wt % residual solvents.

This dry precursor product still suffered from handling problems during conveying to downstream processes. While one might speculate that further drying the precursor by heating at higher temperatures for longer periods of time would reduce the wash solvent content, the present inventor found that drying at higher temperatures for longer periods of time did not reduce the wash solvent content, on average. Drying the precursor at higher temperatures for extended periods of time did, however, solve the handling problems, and, when converted to a procatalyst, produced polymers having improved extruder operability, reduced filter clogging, reduced polymer "talc" (fine polymer particles) and reduced polymer segregation during storage. While not intending on being bound by any theory, it is believed that this excess drying improves the morphology of the precursor which in turn improves the morphology of the procatalyst and ultimately, improves the morphology of the resulting polymer, as evidenced by SEM or other analytical methods. This may be attributable to a reduction in clumping of the solid material, allowing the precursor to move forward into conversion to procatalyst and eventual polymerization as discreet spheroidal particles which tend to be less prone to attritive or other fines producing effects. Alternatively, this might be an effect of reducing the amount of solvation of the solid material (solvent complexed to the solid molecular structure) due to longer times and/or higher drying temperatures This effect might subsequently improve precursor flow and handling properties as well as improve the eventual polymer properties seen in areas like improved extrusion, reduced product segregation, reduced "talc" and less filter clogging.

In accordance with the present invention, the separated solid filter cake containing the procatalyst precursor and residual wash solvent, is dried in excess. Excess drying is effected by supplying dry, moisture-free inlet inert gas (preferably argon or nitrogen) at anywhere from 0.5–50.SCFM per kg of dried precursor product; preferably, from about 1.6–3.2SCFM per kg of dried precursor product; and most preferably, at about 2.4SCFM per kg of dried precursor product, at a temperature more than about 55° C., more preferably, more than about 60° C. Most preferably, the procatalyst precursor is dried at temperatures above 65° C., and is dried for more than 1 hour, preferably more than 2 hours, more preferably more than 3 hours, and most preferably for about 4 hours. It has been found that drying can be conducted for up to 2 or 3 days at temperatures of as high as about 95° C. without any detriment to catalyst productivity or other characteristics, although system, energy and time constraints often dictate drying at somewhat lower temperatures for shorter periods of time. Those skilled in the art will appreciate that the precursors of the present invention can be dried for as long as the system permits, and at as high a temperature as the system permits.

Any mechanism can be used to carry out the drying of the present invention. For example, the filter cake could be dried by flowing a heated inert gas stream through the cake for the time period described above. Alternatively, the filter cake could be removed from the filter and then subsequently dried in a conventional drying apparatus using direct, indirect, infrared, radiant or dielectric heat. Any apparatus capable of drying solids at temperatures of more than about 55° C., for more than about 1 hour can be used in accordance with the present invention. Particularly preferred drying apparatus include, but are not limited to, direct continuous dryers, continuous sheeting dryers, pneumatic conveying dryers, rotary dryers, spray dryers, through-circulation dryers, tunnel dryers, fluid bed dryers, batch through-circulation dryers, tray and compartment dryers, cylinder dryers, screw-conveyor dryers, drum dryers, steam-tube rotary dryers, vibrating-tray dryers, agitated pan dryers, freeze dryers, vacuum rotary dryers and vacuum-tray dryers. Most preferably, the solid precursor material is dried in a single or multiple-leaf combined filter and dryer. Those skilled in the art are capable of designing a suitable dryer to effect drying in accordance with the present invention.

There is no particular limit on when the solid precursor material be dried after it has been separated from the liquid suspension or mixture. Preferably, the solid precursor is dried within two days after separation, more preferably, within one day, even more preferably, within 8 hours, and most preferably immediately after separation.

The precursor of the present invention is not particularly limited, so long as it is dried in accordance with the guidelines provided herein. Any magnesium and/or titanium-containing precursor that is not an active catalyst, does not contain an electron donor, and that can be converted to a procatalyst by contacting it with a metal halide (preferably TiCl$_4$) and an electron donor can be used in accordance with the present invention. Preferably, the precursor contains magnesium (e.g., magnesium ethoxide, carbonylated magnesium ethoxide), and most preferably, the precursor contains magnesium and titanium.

Upon drying the precursor in accordance with the guidelines provided herein, the precursor then can be immediately converted to a procatalyst by any suitable means described below, or it can be stored for later use or for shipment to a facility capable of converting the precursor to a procatalyst. Upon drying, the solid precursor material can be discharged by any suitable means to downstream processing. Solids processing may include conveying to suitable storage and/or transportation containers or to another vessel for additional material processing. During this transfer, solid precursors dried at temperatures below 50° C. have been found to cause some problems in conveyance. This leads to interruptions in product flow and ultimately longer total batch length. Solid precursor material dried in accordance with the present invention, however, does not suffer from these problems and conveys easily.

Conversion of the dried procatalyst precursor can be accomplished in any suitable manner. For example, the dried precursors of the invention can be converted to polymerization procatalyst by reaction with a tetravalent titanium halide, an optional hydrocarbon or halohydrocarbon and an electron donor. The tetravalent titanium halide is suitably an aryloxy- or alkoxy di- or trihalide such as diethoxytitanium dichloride, dihexyloxytitanium dibromide or diisopropoxytitaniumchloride or the tetravalent titanium halide is a titanium tetrahalide such as titanium tetrachloride or titanium tetrabromide. A titanium tetrahalide is preferred as the tetravalent titaniumhalide and particularly preferred is titanium tetrachloride.

The optional hydrocarbon or halohydrocarbon employed in the production of olefin polymerization procatalyst can be a halohydrocarbon of up to 12 carbon atoms inclusive, preferably up to 9 carbon atoms inclusive, which contains at least one halogen atom and in the case of aliphatic halohydrocarbons contains at least two halogen atoms. Exemplary hydrocarbons include acetone, pentane, octane, benzene, toluene, xylene, alkylbenzenes, and the like. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Aromatic halohydrocarbons suitably employed in the present invention include chlorobenzene, bromobenzene, dichlorobenzene and chlorotoluene. Of the aliphatic halohydrocarbons, carbon tetrachloride and 1,1,2-trichloroethane are preferred. The aromatic halohydrocarbon chlorobenzene is particularly preferred.

Any electron donor can be used in the present invention so long as it is capable of converting the precursor into a procatalyst. Suitable electron donors are those electron donors free from active hydrogens that are conventionally employed in the formation of titanium-based procatalysts. Particularly preferred electron donors include ethers, esters, amines, imines, nitriles, phosphines, stibines, and arsines. The more preferred electron donors, however, include esters, particularly alkyl esters of aromatic monocarboxylic or dicarboxylic acids. Examples of such electron donors are methyl benzoate, ethyl benzoate, ethyl p-ethoxybenzoate, ethyl p-methylbenzoate, diethyl phthalate, dimethyl naphthalene dicarboxylate, diisobutyl phthalate and diisopropyl terephthalate. The electron donor is a single compound or is a mixture of compounds but preferably the electron donor is a single compound. Of the preferred ester electron donors, ethyl benzoate and diisobutyl phthalate are particularly preferred.

The manner in which the procatalyst precursor, the optional hydrocarbon or halohydrocarbon and the electron donor are contacted is not critical. In one embodiment, the tetravalent titanium halide is added to a mixture of the electron donor and solid procatalyst precursor. More preferably, however, the electron donor first is mixed with the tetravalent titanium halide and optional halohydrocarbon and the resulting mixture is used to contact the solid procatalyst precursor. Other procedres also are suitable but less preferred. The solid product that results typically is washed at least once with tetravalent titanium halide and the optional halohydrocarbon, taken together or employed separately. It often is useful to include an acid chloride, e.g., benzoyl chloride or phthaloyl chloride in at least one wash to further facilitate the replacement of at least a portion of the alkoxide moieties. This replacement, often termed a halogenation, is well known in the art and skilled artisans are capable of carrying out such halogenation using the guidelines provided herein. The solid olefin polymerization proctalyst that results from this procedure then is usually washed with a light hydrocarbon such as isooctane to remove soluble titanium compounds.

In a preferred embodiment, the mixture of procatalyst precursor, tetravalent titanium halide, electron donor and halohydrocarbon is maintained at an elevated temperature, for example, a temperature of up to about 150° C. Best results are obtained if the materials are contacted initially at or about ambient temperature and then heated. Sufficient tetravalent titanium halide is provided to convert at least a portion and preferably at least a substantial portion of the alkoxide moieties of the procatalyst precursor to halide groups. This replacement is conducted in one or more contacting operations, each of which is conducted over a period of time ranging from a few minutes to a few hours and it is preferred to have halohydrocarbon present during each contacting. Sufficient electron donor usually is provided so that the molar ratio of electron donor to the magnesium present in the solid procatalyst is from about 0.01:1 to about 1:1, preferably from about 0.05:1 to about 0.5:1. The final washing with light hydrocarbon produces a procatalyst that is solid and granular and when dried is storage stable provided that oxygen and active hydrogen compounds are excluded. Alternatively, the procatalyst is used as obtained from the hydrocarbon washing without the need of drying. The procatalyst thus produced is employed in the production of an olefin polymerization catalyst by contacting the procatalyst with a cocatalyst and a selectivity control agent.

The final washed and dried procatalyst product suitably has a titanium content of from about 0.5 percent by weight to about 6.0 percent by weight, preferably from about 1.5 percent by weight to about 4.0 percent by weight. The atomic ratio of titanium to magnesium in the final procatalyst product is suitably between about 0.01:1 and about 0.2:1, preferably between about 0.02:1 and about 0.1:1. The internal electron donor is present in the procatalyst in a ratio of internal electron donor to magnesium of from about 0.005:1 to about 10.0:1, preferably from about 0.02:1 to about 2.0:1.

The magnesium and titanium-containing procatalyst serves as one component of a Ziegler-Natta catalyst system where it is contacted with a cocatalyst and a selectivity control agent. The cocatalyst component employed in the Ziegler-Natta catalyst system may be chosen from any of the known activators of olefin polymerization catalyst systems employing a titanium halide, but organoaluminum compounds are preferred. Illustrative organoaluminum cocatalysts include trialkylaluminum compounds, alkylaluminum alkoxide compounds and alkylaluminum halide compounds in which each alkyl independently has from 2 to 6 carbon atoms inclusive. The preferred organoaluminum cocatalysts are halide free and particularly preferred are the trialkylaluminum compounds such as those wherein each of the alkyl groups contain from 1 to 6 carbon atoms. Suitable organoaluminum cocatalysts include compounds having the formula $Al(R''')_d X_e H_f$ wherein: X is F, Cl, Br, I or OR'''', R''' and R'''' are saturated hydrocarbon radicals containing from 1 to 14 carbon atoms, which radicals may be the same or different, and, if desired, substituted with any substituent which is inert under the reaction conditions employed during polymerization, d is 1 to 3, e is 0 to 2, f is 0 or 1, and d+e+f=3. Such cocatalysts can be employed individually or in combination thereof and include compounds such as $Al(C_2H_5)_3$, $Al(C_2H_5)_2Cl$, $Al_2(C_2H_5)_3Cl_3$, $Al(C_2H_5)_2H$, $Al(C_2H_5)_2(OC_2H_5)$, $Al(i-C_4H_9)_3$, $Al(i-C_4H_9)_2H$, $Al(C_6H_{13})_3$ and $Al(C_8H_{17})_3$.

Preferred organoaluminum cocatalysts are triethylaluminum, triisopropylaluminum, triisobutylaluminum and diethylhexylaluminum. Triethylaluminum is a preferred trialkylaluminum cocatalyst. The organoaluminum cocatalyst, during formation of the olefin polymerization catalyst, is preferably employed in a molar ratio of aluminum to titanium of the procatalyst of from about 1:1 to about 150:1, but more preferably in a molar ratio of from about 10:1 to about 100:1.

The final component of the Ziegler-Natta catalyst system is the selectivity control agent (SCA), or external electron donor. Typical SCAs are those conventionally employed in conjunction with titanium-based procatalysts and organoaluminum cocatalysts. Illustrative of suitable selectivity control agents are those classes of electron donors employed in procatalyst production as described above as well as organosilane compounds including alkylaklyoxysilanes and arylalkoxysilanes. Particularly suitable silicon compounds of the invention contain at least one silicon-oxygen-carbon linkage. Suitable silicon compounds include those having the formula $R^1_m SiY_n X_p$ wherein: $R^1$ is a hydrocarbon radical containing from 4 to 20 carbon atoms, Y is $-OR^2$ or $-OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 1, and preferably 0, and m+n+p=4. $R^1$ should be such that there is at least one non-primary carbon in the alkyl and preferably, that such non-primary carbon is attached directly to the silicon atom. Examples of $R^1$ include cyclopentyl, t-butyl, isopropyl or cyclohexyl. Examples of $R^2$ include ethyl, butyl, isopropyl, phenyl, benzyl and t-butyl. Examples of X are Cl and H.

Each $R^1$ and $R^2$ may be the same or different, and, if desired, substituted with any substituent which is inert under the reaction conditions employed during polymerization. Preferably, $R^2$ contains from 1 to 10 carbon atoms when it is aliphatic and may be sterically hindered or cycloaliphatic, and from 6 to 10 carbon atoms when it is aromatic. Silicon compounds in which two or more silicon atoms are linked to each other by an oxygen atom, i.e., siloxanes or polysiloxanes, may also be employed, provided the requisite silicon-oxygen-carbon linkage is also present. The preferred selectivity control agents are alkylalkoxysilanes such as ethyldiethoxysilane, diisobutyldimethoxysilane, cyclohexylmethyldimethoxysilane, propyltrimethoxysilane and dicyclopentyldimethoxysilane. In one modification, the selectivity control agent is a portion of the electron donor added during procatalyst production. In an alternate modification the selectivity control agent is provided at the time of the contacting of procatalyst and cocatalyst. In either modification, the selectivity control atent is provided in a quantity of from 0.1 mole to about 100 moles per mole of titanium in the procatalyst. Preferred quantitites of selectivity control agent are from about 0.5 mole to about 25 mole per mole of titanium in the procatalyst.

The olefin polymerization catalyst is produced by any known procedure of contacting the procatalyst, the cocatalyst and the selectivity control agent. The method of contacting is not critical. In addition, the catalyst components can be precontacted prior to polymerization to form a preactivated catalyst, or the components can be contacted with an olefin monomer to form a prepolymerized catalyst. In one modification, the catalyst components simply are mixed in a suitable reactor and the preformed catalyst thereby produced is introduced into the polymerization reactior when initiation of polymerization is desired. In an alternate modification, the catalyst components are introduced into the polymerization reactor where the catalyst is formed in situ.

The olefin polymerization catalyst may be used in slurry, liquid phase, gas phase and liquid monomer-type reaction systems as are known in the art for polymerizing olefins. Polymerization preferably is conducted in a fluidized bed polymerization reactor, however, by continuously contacting an alpha-olefin having 3 to 8 carbon atoms with the three components of the catalyst system, i.e, the solid procatalyst component, cocatalyst and SCAs. In accordance with the process, discrete portions of the catalyst components are continually fed to the reactor in catalytically effective amounts together with the alpha-olefin while the polymer product is continually removed during the continuous process. Fluidized bed reactors suitable for continuously polymerizing alpha-olefins have been previously described and are well known in the art. Fluidized bed reactors useful for this purpose are described, e.g., in U.S. Pat. Nos. 4,302,565, 4,302,566 and 4,303,771, the disclosures of which are incorporated herein by reference. Those skilled in the art are capable of carrying out a fluidized bed polymerization reaction using the guidelines provided herein.

It is preferred sometimes that such fluidized beds are operated using a recycle stream of unreacted monomer from the fluidized bed reactor. In this context, it is preferred to condense at least a portion of the recycle stream. Alternatively, condensation may be induced with a liquid solvent. This is known in the art as operating in "condensing mode." Operating a fluidized bed reactor in condensing mode generally is known in the art and described in, for example, U.S. Pat. Nos. 4,543,399 and 4,588,790, the disclosures of which are incorporated by reference herein in their entirety. The use of condensing mode has been found to lower the amount of xylene solubles in isotactic polypropylene and improve catalyst performance when using the catalyst of the present invention.

The precise procedures and conditions of the polymerization are broadly conventional but the olefin polymerization process, by virtue of the use therein of the polymerization catalyst formed from the solid precursor, provides polyolefin product and particularly polypropylene product having a relatively high bulk density in quantities that reflect the relatively high productivity of the olefin polymerization catalyst. Moreover, the polyolefin product of the invention exhibits improved extruder operability when compared to polyolefins prepared using conventional procatalyst and procatalyst precursors. Improved extruder operability is denoted by improved throughput. Ultimately, polymer particles which are more uniform in size with low amounts of polymer fines reduce the total extruder torque requirement and thus the energy input required for extrusion at a given rate. Therefore, polymer with narrower polymer particle size distribution and reduced polymer fine particles can benefit extrusion rate. Reduced filter clogging also is realized during the manufacture of the polyolefin using the procatalyst precursors of the invention, less talc is formed during polymer production, and less product segregation is found when the polymer product is stored.

The polymerization product of the present invention can be any product, homopolymer, copolymer, terpolymer, and the like. Usually, the polymerization product is a homopolymer such as polyethylene or polypropylene, particularly polypropylene. Alternatively, the catalyst and process of the invention are useful in the production of copolymers including copolymers of ethylene and propylene such as EPR and polypropylene impact copolymers when two or more olefin monomers are supplied to the polymerization process. Those skilled in the art are capable of carrying out suitable polymerization of homopolymers, copolymers, terpolymers, etc., using liquid, slurry or gas phase reaction conditions, using the guidelines provided herein.

The invention is further illustrated by the following Examples which should not be regarded as limiting of the present invention.

EXAMPLES

Catalyst Precursor Preparation

A magnesium and titanium-containing procatalyst precursor was prepared in accordance with the procedures described in, for example, U.S. Pat. No. 5,077,357. The solid material then is dried in accordance with the procedures outlined in Table 1 below for each of examples 1–11. The dried material then was discharged from the filter and proceeded into downstream processing operations.

TABLE 1

| Example | Drying Temp. (° C.) | Drying Time (hr.) | Residual Solvent (wt. % iC5) |
|---|---|---|---|
| 1 | 46 | ~1.3 | 0.15 |
| 2 | 46 | ~1.3 | 0.12 |
| 3 | 46 | ~1.3 | 0.22 |
| 4 | 46 | ~1.3 | 0.27 |
| 5 | 46 | ~1.3 | 0.37 |
| 6 | 66 | ~1.3 | 0.35 |
| 7 | 46 | ~1.3 | 0.41 |
| 8 | 66 | ~1.3 | 0.48 |
| 9 | 66 | ~4.0 | 0.29 |

TABLE 1-continued

| Example | Drying Temp. (° C.) | Drying Time (hr.) | Residual Solvent (wt. % iC5) |
|---|---|---|---|
| 10 | 66 | ~4.0 | 0.18 |
| 11 | 66 | ~4.0 | 0.32 |

As can be seen from the above table, examples 1–5 and 7 utilized drying at conventional temperatures for a time sufficient to effectively evaporate residual wash solvent to low levels. This period of time took, on average, about 1.3 hours. In examples 6 and 8, the solid material on the filter was dried at an elevated temperature but for the conventional drying time of about 1.3 hours. Examples 9–11 were dried at an elevated temperature for a period of about 4 hours.

The examples wherein the precursor was dried at elevated temperatures produced solids having a higher average residual solvent content than those dried at lower temperatures. For the examples in which drying was effected at both higher temperatures and for longer times, however, the residual solvent content of the precursor was on average about the same as the residual solvent content of precursors dried at lower temperatures for about 1.3 hours. Thus, in contrast to what one might expect, drying at elevated temperatures for longer periods of time did not have a quantified effect on the residual solvent content of the procatalyst precursor.

The following table summarizes the ease by which precursors prepared by drying at elevated temperature and time was conveyed from the drying apparatus discharge to subsequent processing. The transfer time is the total time needed to fully convey a complete batch of dry precursor material. The number of incidents (clumping incidents) are defined as incidents that stopped flow and required application of blowback inert gas pressure to dislodge any clumped or bridged solid particles to thereby resume dry product flow.

TABLE 2

| Examples | Transfer Time (hr.) | Number of Incidents |
|---|---|---|
| 1–8 | 2 | ~4 |
| 9–11 | <1 | 0 |

As can be seen from the above table, precursors that were dried at elevated temperatures for longer periods of time took less time to convey, and had significantly fewer clumping incidents than precursors that were dried at about 46° C.

Catalyst Procatalyst Preparation

Precursor material created from each of the above-mentioned examples was subsequently converted to procatalyst in accordance with the procedures described in, for example, U.S. Pat. No. 5,077,357.

Polymerization

Each of the above-mentioned solid catalyst procatalysts was employed, together with a cocatalyst and a selectivity control agent or outside electron donor, to polymerize propylene in a fluid bed reactor system as disclosed and illustrated in U.S. Pat. Nos. 4,302,565, 4,302,566 and 4,303,771, the disclosures of which are incorporated by reference herein in their entirety.

Table 3 below summarizes the results of the polymerization.

TABLE 3

| Example | Extruder Operation | Filter Clogging | "Talc" Production | Polymer Segregation |
|---|---|---|---|---|
| 1 | − | ○ | Δ | + |
| 2 | − | ○ | Δ | + |
| 3 | − | ○ | Δ | + |
| 4 | − | ○ | Δ | + |
| 5 | − | ○ | Δ | + |
| 6 | + | X | ▽ | 0 |
| 7 | − | ○ | Δ | + |
| 8 | + | X | ▽ | 0 |
| 9 | + | X | ▽ | 0 |
| 10 | + | X | ▽ | 0 |
| 11 | + | X | ▽ | 0 |

In the above Table 3, extruder operation was measured by using precursors dried at 46° C. for about 1.3 hours as a baseline, indicated as −, and improvements in extruder operability when compared to the baseline were indicated as a +. Filter clogging was characterized by the presence of fine materials in the polymerization gas recycle filters also was measured by using precursors dried at 46° C. for about 1.3 hours as a baseline, indicated as 0, and reductions in filter clogging were indicated by a X. In a similar fashion, "talc" production, (characterized as very fine polymer particles of <10 micron) was measured by using precursors dried at 46° C. for about 1.3 hours as a baseline, indicated as Δ, and reductions in "talc" production were indicated by a ▽. Finally, polymer segregation, characterized by polymer product size segregation while in storage was measured by using precursors dried at 46° C. for about 1.3 hours as a baseline, indicated as + if any segregation occurred, and 0 if no segregation occurred.

Based on the results shown in Table 3 above, procatalysts prepared using precursors that were dried in accordance with the present invention were effective in polymerizing polyolefins by improving extruder operability, reducing filter clogging and reducing the production of "talc" during polymer production, as well as significantly decreasing the incidence polymer particle size segregation events during polymer product storage.

What is claimed is:

1. A method of making a solid, substantially dry olefin procatalyst precursor comprising magnesium and titanium comprising:

a) forming a solid procatalyst precursor material containing magnesium and titanium either in solution or slurry;

b) separating the solid procatalyst precursor material from the liquid; and c) drying the solid procatalyst precursor material at a temperature above 50° C. for over one hour.

2. The method as claimed in claim 1, wherein step a) comprises contacting a magnesium alkoxide, a titanium tetraalkoxide and a phenolic compound.

3. The method as claimed in claim 2, wherein the magnesium alkoxide is magnesium ethoxide, the titanium tetraalkoxide is titanium tetraethoxide and the phenolic compound is o-cresol, and the components are contacted in the presence of a diluent.

4. The method as claimed in claim 1, wherein the solid procatalyst precursor material is separated in step b) by filtration followed by sequential washing with an inert diluent.

5. The method as claimed in claim 1, wherein the solid procatalyst precursor is dried in step c) at a temperature above 55° C.

6. The method as claimed in claim 1, wherein the solid procatalyst precursor is dried at a temperature at about 65° C.

7. The method as claimed in claim 1, wherein the solid procatalyst precursor material is dried in step c) for over 2 hours.

8. The method as claimed in claim 1, wherein the solid procatalyst precursor material is dried for over 3 hours.

9. The method as claimed in claim 6, wherein the solid procatalyst precursor material is dried for over 3 hours.

10. A solid, substantially dry procatalyst precursor material prepared in accordance with the method of claim 1.

* * * * *